United States Patent [19]

Dischert et al.

[11] 4,024,571

[45] May 17, 1977

[54] SYNCHRONIZING SYSTEM EMPLOYING BURST CROSSOVER DETECTION

[75] Inventors: Robert Adams Dischert, Burlington; James Morgan Walter, Collingswood, both of N.J.

[73] Assignee: RCA Corporation, New York, N.Y.

[22] Filed: Aug. 14, 1975

[21] Appl. No.: 604,670

[52] U.S. Cl. .................................. 358/4; 358/19; 358/8

[51] Int. Cl.[2] .................................. H04N 9/46

[58] Field of Search ............... 178/69.5 TV; 358/4, 358/8, 19, 20; 360/36

[56] References Cited

UNITED STATES PATENTS

| | | | |
|---|---|---|---|
| 3,103,553 | 9/1963 | Newell | 358/8 |
| 3,637,936 | 1/1972 | Krause | 358/8 |
| 3,921,202 | 11/1975 | Dann et al. | 358/8 |

OTHER PUBLICATIONS

Coleman, "A New Technique for Time-Base Stabilization of Video Recorders," *IEE Transactions on Broadcasting,* vol. BC-17, No. 1, Mar. 1971, pp. 29-36.
Edwardson, "The Digital Timing Correction of Video Tape Recorded Colour Television Signals," *Proceedings of the Conference on Video and Data Recording,* Birmingham, England, 10-12 July 1973, pp. 27-39.

*Primary Examiner*—John C. Martin
*Attorney, Agent, or Firm*—E. M. Whitacre; M. DeCamillis

[57] ABSTRACT

A synchronizing system separates the synchronizing components from a composite video signal into signal components representing horizontal sync and color burst. The leading edge of the horizontal sync component is used to develop a timing signal which is compared with the positive and negative averaged burst signal from a band pass filter tuned to the burst frequency. Comparators drive respective flip-flops arranged to provide both negative and positive burst signal outputs at a selected burst signal crossover near the end of the original burst signal.

A gate circuit coupled to the flip-flop output terminals develops a line start signal which contains the leading edge of the incoming signal sync information corrected to a selected color burst. The synchronizing circuit also provides a substitute signal in the absence of the color burst component to maintain system synchronization.

3 Claims, 3 Drawing Figures

SYNCHRONIZING SYSTEM EMPLOYING BURST CROSSOVER DETECTION

BACKGROUND OF THE INVENTION

The present invention relates to a signal synchronizing system and in particular to a synchronizing system useful for time base correction systems.

Time base correcting synchronizing systems are generally applicable where it is desirable to derive timing signals from a source of signals such as television signals which have been recorded on a magnetic medium.

When a recorded medium, for example, in the form of magnetic tape, is replayed it is common to find that the recovered signal includes time base variations due, for example, to mechanical limitations of the recording and playback mechanism of the recorder as well as variations in the medium itself. If left uncorrected these time base variations will produce picture defects in the reproduced image which may range from objectionable color reproduction to a complete breakup of the image scanning raster.

In general time base errors are corrected by writing the incoming television signal into a storage medium at a time rate which varies with the time base errors (jitter) accompanying the incoming signal. Once stored the television signal is read out of storage at a time rate determined by a stable local reference. A time base corrector of this general description is described in detail in co-pending application Ser. No. 604,775 of A.C. Dischert, Jr., et al. entitled SIGNAL PROCESSOR USING CHARGE-COUPLED DEVICES assigned to the same assignee and filed concurrently herewith.

In time base correctors which are to be utilized with color television signals it is not satisfactory to vary the write-in time rate only in accordance with the time error of the leading edge of the incoming synchronizing component of the horizontal line rate. This is because the color reference component, burst, which occurs during the horizontal blanking interval of each television line is not time-defined in terms of the leading edge of the horizontal synchronizing component. Therefore it is necessary when processing color television signals which require time base correction to accurately determine the burst crossovers or phasing with respect to the leading edge of the horizontal synchronizing components.

SUMMARY OF THE INVENTION

A synchronizing system for providing timing signals from a composite video signal of a type including synchronizing signals comprises sync separating means for separating the synchronizing components from the composite video signal into at least a horizontal sync signal component representative of the beginning of a horizontal television line and a color signal reference component the phasing of which varies with respect to said horizontal sync component. Timing means coupled to the sync separating means develop a timing reference signal from the leading edge of the horizontal sync component. Comparator means coupled to the sync separating means and to the timing means compare the timing reference signal with a selected crossover of the color signal component. Output means coupled to the comparator means develop a timing signal which represents the horizontal sync component referenced to the selected crossover of the color information signal.

A further feature of the invention provides a video read/write synchronizing system wherein the phase of the read signal is maintained consistent with the phase of the write signal. The synchronizing system comprises a first synchronizing circuit coupled to an image information signal for providing a write signal and related burst edge crossover signal, a second synchronizing circuit coupled to a reference signal for providing a read signal and a related burst edge crossover signal. Gate means coupled to the read and write related burst edge crossover signal outputs determine the phase of the write signal related burst edge crossover signal with respect to the phase of the read signal related burst edge crossover signal. Control means coupled to the phase determining means and to either one of the synchronizing circuits alter the phasing of its related burst edge crossover signal so as to maintain a constant phase relationship between the read and write signals.

The present invention will be better understood with reference to the accompanying drawings and specification in which.

Figure 1:
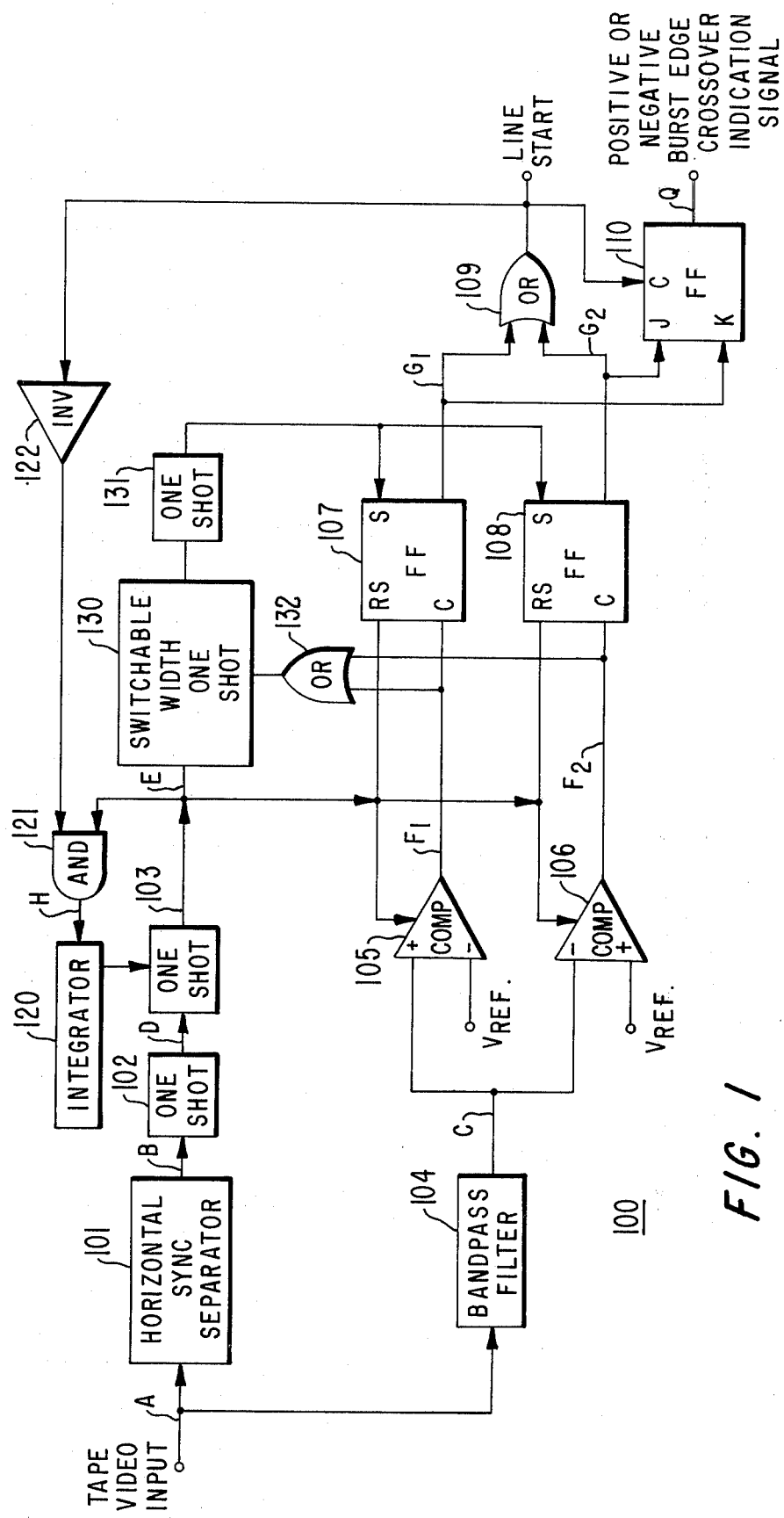
FIG. 1 is a block diagram of a synchronizing system embodying the present invention.
Figure 2:
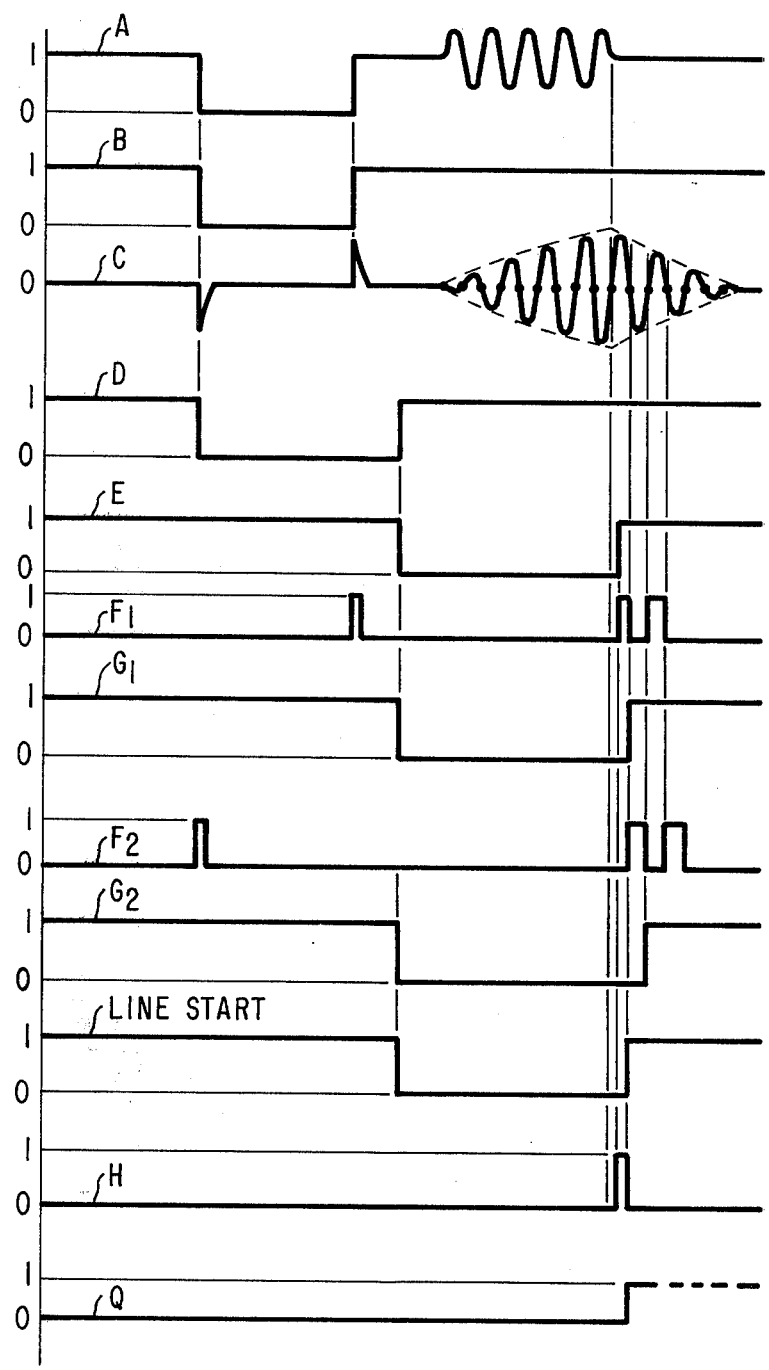
FIG. 2 illustrates waveforms depicting the operation of the apparatus of FIG. 1.

In FIG. 1 various points in the block diagram have been identified with letters corresponding to the waveforms illustrated in FIG. 2 for a better understanding of the operation of the apparatus of FIG. 1.

Waveform 2A of FIG. 2 represents the horizontal blanking interval portion of a composite video signal in which the horizontal synchronizing component and burst signal have been greatly expanded to more clearly relate the remaining waveforms 2B to 2Q of FIG. 2.

In FIG. 1 a composite video waveform represented by a waveform A (FIG. 2) is coupled to a horizontal sync separator 101 and a bandpass filter 104 for developing signals representing the horizontal sync component (waveform B) and the color component (burst) signal (waveform C). The burst signal is the same frequency as the 3.58 MHz color signal modulated subcarrier frequency of the composite color television video signal. Horizontal sync separator 101 is of any suitable conventional design. Bandpass filter 104 is an L-C circuit tuned to the center frequency e.g., (3.58 MHz) of the subcarrier signal (burst). The narrow bandpass of filter 104 ensures that each cycle of the burst couples increasing amounts of enerty into the resonant circuit. The resonant circuit averages phase perturbations of individual burst cycles relative to the resonant frequency and provides at its output terminal a sine wave significantly reduced in phase modulation. The last cycle of burst is thus the average of all the previous cycles.

The output terminal of horizontal sync separator 101 (waveform B) is coupled to a one-shot multivibrator 102 the output signal (waveform D) of which is in turn coupled to a one-shot 103. One-shot 102 and 103 are of fixed time duration and operate as follows. The leading edge of the horizontal sync component (waveform B) triggers one-shot 102 the output signal trailing edge (waveform D) of which in turn triggers one-shot 103 which develops an output signal (waveform E) the trailing edge of which is delayed a predetermined time from the leading edge of the horizontal sync component. Since it is a feature of the present invention to provide means for detecting a selected burst crossover i.e., a selected zero crossing of the burst signal axis, the duration of the pulses of one-shot 102 and one-shot 103 is selected to just exceed the end of the original burst signal as represented by waveform A. Thus the output signal of one-shot 103 serves to provide a basic reference signal against which a selected crossover of burst may be compared as follows. The output terminal of bandpass filter 104 (waveform C) is coupled to one input terminal of each of comparators 105 and 106. Positive and negative reference voltages are coupled respectively to the other input terminals of comparators 106 and 105. The output signals of comparators 105 and 106 (waveforms $F_1$ and $F_2$ of FIG. 2) are in turn respectively coupled to flip-flops 107 and 108. The timing signal (waveform E) developed from the leading edge of horizontal sync as described above is coupled to comparators 105, 106 and flip-flops 107 and 108 as a gating pulse hereinafter referred to as a strobe signal.

In operation the active comparator as determined by the polarity of the burst signal accompanying the current horizontal line, e.g., positive makes comparator 105 active, will enable flip-flop 107 so that the first negative going burst crossover after the strobe signal (waveform E) will cause the flip-flop 107 to develop an output signal (waveform $G_1$). Similarly when the burst signal accompanying the horizontal line is negative comparator 106 is active (waveform $F_2$) and flip-flop 108 is enabled so that the first negative going burst crossover after the strobe signal (waveform E) will cause flip-flop 108 to develop an output signal (waveform $G_2$).

The output signals from flip-flops 107 and 108 (waveforms $G_1$ and $G_2$) are coupled to an OR gate 109 which in turn develops an output signal (waveform-line start). Thus the ouput signal (line start) represents the leading edge of the incoming horizontal sync component corrected to the selected crossover (first negative going burst crossover in the illustrated embodiment) of averaged burst from bandpass filter 104 and is properly representative of the phasing of the subcarrier which contains the color component information.

In the absence of the color component signal, e.g., during the 9H vertical interval, loss of burst during transmission or recording, as well as in monochrome signals which do not have a burst signal, it is necessary to make provisions for continuing to develop line start signals from OR gate 109. This is accomplished as follows: In the absence of a burst signal, comparators 105 and 106 will not develop output signals (waveforms $F_1$ and $F_2$) to enable flip-flops 107 and 108. However, the strobe signal (waveform E) which is coupled to one-shot 130 causes one-shot 130 to generate an approximate ½ cycle pulse and in turn the output of one-shot 130 coupled to one-shot 131 causes one-shot 131 to produce a 2 μsec pulse the leading edge of which is in turn coupled to flip-flops 107 and 108 which will set and reset the flip-flops to develop output signals ($G_1$ and $G_2$) to operate OR gate 109.

When the color burst signal is restored, e.g., the end of the 9H interval, or application of an input signal containing color information, the comparators again develop output signals ($F_1$ and $F_2$). These output signals are coupled to OR gate 132, which is in turn coupled to the switchable width one-shot 130, and change the width of the output signal developed by one-shot 130 to exceed ½ cycle of burst. One-shot 130 is made of switchable width by varying the supply voltage to its associated timing capacitor. For example, the application of signals $F_1$ and $F_2$ will reduce the supply voltage and extend the width of the pulse output signal from one-shot 130. Thus flip-flops 107 and 108 are enabled in the desired sequence by the selected crossover. The output signal of one-shot 131 coupled to flip-flops 107 and 108 is not able to change the state of flip-flops 107 and 108 since the flip-flops are under the influence of the respective comparator outputs and the substitute signal from one-shot 131 is ignored.

Because the trailing edge of the strobe signal (waveform E) and the active comparator output (waveform $F_1$ and $F_2$) can reach an ambiguous condition where the edges of strobe signal E and comparator output R are coincident, thereby preventing flip-flops 107 and 108 from properly changing state it is necessary to provide means for keeping these edges apart in order to insure that respective flip-flops 107 and 108 may be properly enabled. This is accomplished as follows: the strobe signal (waveform E) and the (inverted) output of OR gate 109 (line-start) are compared in AND gate 121 to produce a difference signal (waveform H) representing the time difference between the strobe signal and the line start signal. This difference signal is integrated in integrator 120 to produce a d.c. value which is coupled into one-shot 103 which generated the strobe signal (waveform E). Thus as the difference signal (waveform H) decreases in width because of burst timing changes, the strobe signal waveform E is reduced in width to maintain the strobe signal and active comparator signal output edges separated. This separation may be effectively labeled as hysteresis and the d.c. value a "hysteresis d.c.". The position of the trailing edge of the strobe signal thus shifts its position to insure that the selected (first negative going) crossover will be identified. This action is limited to approximately ¼ cycle of burst by the maximum value of the d.c. hysteresis voltage applied to the timing circuit of one-shot 103. If larger timing changes in burst are encountered, the line start signal will step to the next burst ½ cycle and hold this position until there is again an excess timing change in burst.

Figure 3:
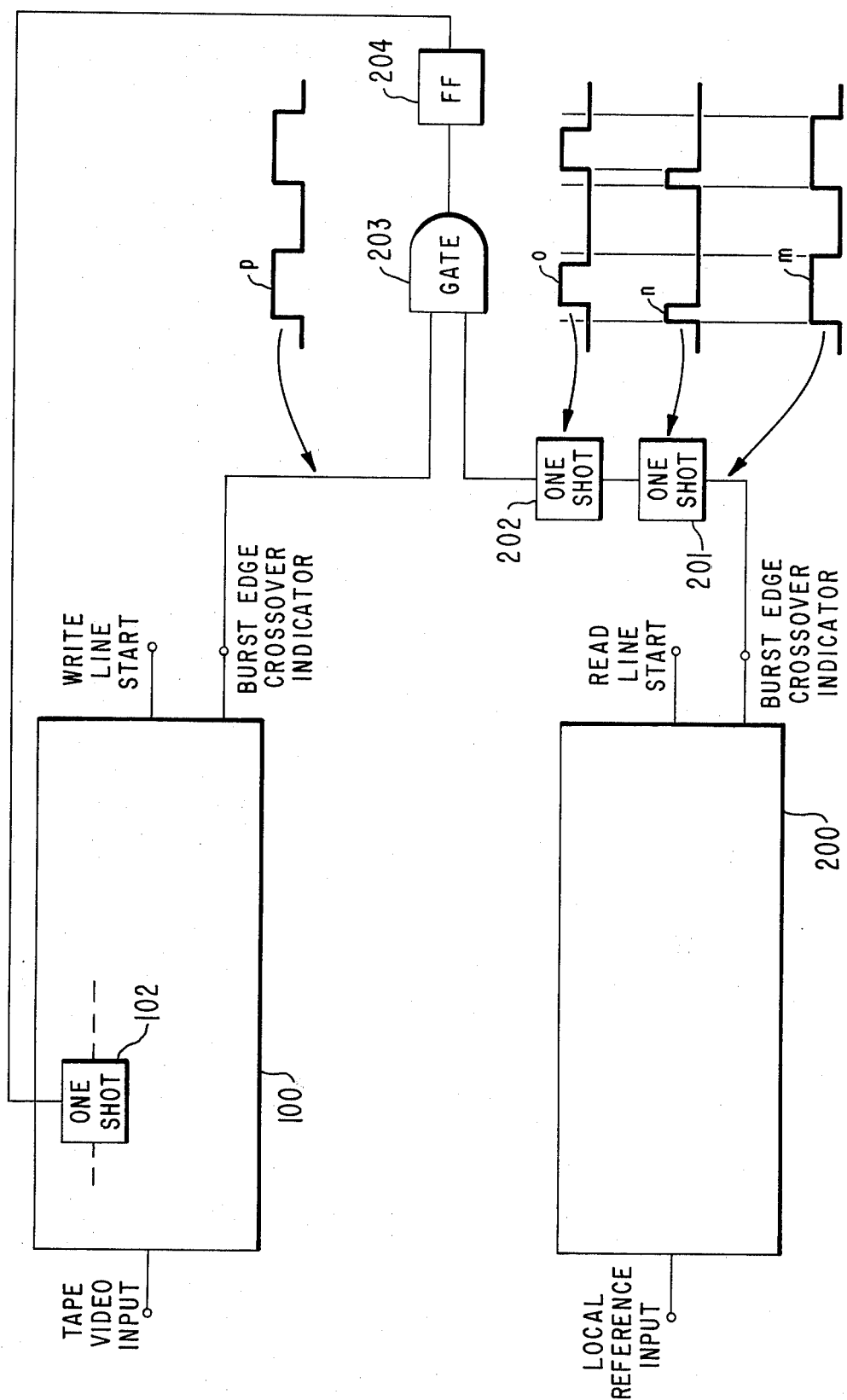
FIG. 3 is a block diagram of a video read/write circuit embodying the synchronizing system of the present invention.

In FIG. 3 a video read/write synchronizing system embodiment utilizing the invention is illustrated. In operation the incoming signal identified as Tape Video Input is coupled to a synchronizing circuit 100 constructed in accordance with FIG. 1. As previously described the output signal of synchronizing circuit 100 (line start) is utilized to write the input signal into a means of storage.

Similarly a second synchronizing circuit 200, also constructed in accordance with FIG. 1, having a local reference input signal develops a line start output signal which is utilized to read the stored signal out of storage. In a read/write system it is necessary to read into and out of storage with consistent burst phase. This is accomplished as follows. Referring to FIG. 1 a JK flip-flop 110 is coupled to the output terminals of flip-flops 107, 108 (waveforms $G_1$ and $G_2$) additionally a further input (line start) is used to clock flip-flop 110. Because the output signal of flip-flop 107 (waveform $G_1$) occurs early on one horizontal television line and the output signal of flip-flop 108 (waveform $G_2$) occurs early on the next succeeding horizontal television line, flip-flop 110 generates an output signal (waveform Q) in the form of a one-half horizontal line rate square wave. This output signal indicates the detected burst edge polarity. In FIG. 3 the burst polarity indication (waveform Q) from the input signal (write) and reference (read) synchronizing circuits are compared to provide a consistent burst phase between the read and write signals. Specifically, the burst edge polarity signal from tape input synchronizing circuit 100 is coupled to one input terminal of a gate 203. The other input terminal of gate 203 is coupled through one-shots 201 and 202 to the burst edge polarity signal output terminal of local reference synchronizing circuit 100. In operation one-shots 201 and 202 serve to narrow the burst edge square wave from the local reference synchronizing circuit to insure that edge coincidence between polarity signals (waveforms p and m, which correspond respectively to waveforms p and o at the inputs of gate 203) does not affect phase determination. If the read and write burst edge polarity signals from the two synchronizing circuits 100 are of the same phase, gate 203 will develop an output signal which triggers flip-flop 204. Flip-flop 204 in turn feeds back to one-shot 102 of either of the synchronizing circuits 100 or 200 to modify the timing of the pulse output of one-shot 102 (waveform D) by ½ cycle of burst. Thus the output signals of flip-flops 107 and 108 are reversed which in turn reverses the input signals to flip-flop 110 resulting in an inverted polarity of the output signal of the burst edge polarity signal (waveform P of FIG. 3) to the input terminal of gate 203. In this manner the burst polarity signal is maintained consistently out-of-phase. Alternatively, the logic circuitry of the apparatus illustrated in FIGS. 1 and 3 may be arranged to provide burst polarity edge signals which are consistently in phase. Since the burst edge polarity signals are derived from and have a fixed time relationship to the read and write line start signals, maintaining the burst edge polarity signals consistent insures that the read-in to storage and read-out of storage is done at consistent burst phasing.

What is claimed is:

1. A synchronizing system for providing timing signals from a composite video signal of a type including synchronizing signals, comprising:

means for separating said synchronizing signals from said composite video signal into at least a horizontal synchronizing signal component representative of the beginning of television line and a color signal component the phasing of which varies with respect to said horizontal synchronizing signal component;

means coupled to said separating means for developing a timing reference signal from the leading edge of said horizontal sync component;

first comparator means coupled to said separating means and to said timing means for comparing said timing reference signal with a selected positive crossover of said color signal component;

second comparator means coupled to said separating means and to said timing means for comparing said timing reference signal with a selected negative crossover of said color signal component; and output means coupled to said comparator means for developing a timing signal which represents said horizontal sync component referenced to the first occurring output signal from said first and second comparator means.

2. A synchronizing circuit according to claim 1 wherein said comparator means further includes signal generating means for providing a substitute comparison signal in the absence of said selected crossover; and said output means develops a timing signal which represents said horizontal sync component referenced to said substitute signal whereby said timing signal is maintained in the absence of the color signal component.

3. A video read/write synchronizing system wherein the phase of the read signal is maintained consistent with the phase of the write signal, comprising:

a first synchronizing circuit coupled to an image information signal for providing a write signal and a related burst edge crossover signal;

a second synchronizing circuit coupled to a reference signal for providing a read signal and a related burst edge crossover signal;

a gate circuit having first and second input terminals coupled respectively to said burst edge crossover signals from said first and second synchronizing circuits, the output terminal of said gate circuit indicating the in-phase or out-of-phase status of said burst crossover signals; and a flip-flop circuit having it input terminal coupled to the output terminal of said gate circuit and its output terminal coupled to one of said first and said second synchronizing circuits and responsive to either said in-phase or said out-of-phase status for inverting its related burst crossover signal so as to maintain a constant phase relationship between said read and said write signals.

* * * * *

UNITED STATES PATENT OFFICE
CERTIFICATE OF CORRECTION

PATENT NO. : 4,024,571
DATED : May 17, 1977
INVENTOR(S) : Robert Adams Dischert et al.

It is certified that error appears in the above-identified patent and that said Letters Patent are hereby corrected as shown below:

Column 1, Line 31 - "A. C. Dischert, Jr." should be -- R. A. Dischert, Jr. -- ;

Column 2, Line 53 - "enerty" should be -- energy -- ;

Column 4, Line 53 - "write" should be -- *write* -- ;

Column 4, Line 58 - "read" should be -- *read* -- ; and

Column 6, Line 43 - "it" should be -- its -- .

Signed and Sealed this

*Twenty-seventh* Day of *September 19*

[SEAL]

Attest:

RUTH C. MASON
*Attesting Officer*

LUTRELLE F. PARKER
*Acting Commissioner of Patents and Trademar*